US00RE45050E

(19) United States
(12) Reissued Patent
Terlizzi et al.

(10) Patent Number: US RE45,050 E
(45) Date of Reissued Patent: Jul. 29, 2014

(54) SYSTEMS AND METHODS FOR DETERMINING THE CONFIGURATION OF ELECTRONIC CONNECTIONS

(75) Inventors: Jeffrey J. Terlizzi, San Francisco, CA (US); Stanley Rabu, Santa Clara, CA (US); Nicholas R. Kalayjian, San Carlos, CA (US)

(73) Assignee: Apple Inc., Cupertino, CA (US)

(21) Appl. No.: 13/232,989

(22) Filed: Sep. 14, 2011

Related U.S. Patent Documents

Reissue of:
(64) Patent No.: 7,589,536
Issued: Sep. 15, 2009
Appl. No.: 11/650,130
Filed: Jan. 5, 2007

(51) Int. Cl.
*G01R 31/04* (2006.01)

(52) U.S. Cl.
USPC ..... 324/538; 324/527; 370/201; 710/16; 710/38

(58) Field of Classification Search
USPC ..... 324/538, 527; 370/201; 710/16, 38
See application file for complete search history.

(56) References Cited

U.S. PATENT DOCUMENTS

| | | | | |
|---|---|---|---|---|
| 3,760,335 | A | 9/1973 | Roberts | |
| 4,468,612 | A | 8/1984 | Starr | |
| 4,792,986 | A | 12/1988 | Garner et al. | |
| 4,968,929 | A | 11/1990 | Hauck et al. | |
| 5,295,843 | A | 3/1994 | Davis et al. | |
| 5,380,225 | A | 1/1995 | Inaoka | |
| 5,387,110 | A | 2/1995 | Kantner et al. | |
| 5,442,243 | A | 8/1995 | Bailey | |
| 5,785,557 | A | 7/1998 | Davis | |
| 5,959,848 | A | 9/1999 | Groves et al. | |
| 6,145,037 | A | 11/2000 | Sakakibara | |
| 6,368,146 | B2 | 4/2002 | Abbott | |
| 6,452,402 | B1 * | 9/2002 | Kerai | 324/538 |
| 6,460,094 | B1 | 10/2002 | Hanson et al. | |
| 6,482,045 | B2 | 11/2002 | Arai | |

(Continued)

FOREIGN PATENT DOCUMENTS

| | | | |
|---|---|---|---|
| DE | 202004012084 | U1 | 11/2004 |
| EP | 2034423 | A2 | 11/2009 |

(Continued)

OTHER PUBLICATIONS

Final Rejection for U.S. Appl. No. 13/232,978 mailed on Nov. 6, 2012, 29 pages.

(Continued)

*Primary Examiner* — Melissa Koval
*Assistant Examiner* — Benjamin M Baldridge
(74) *Attorney, Agent, or Firm* — Kilpatrick Townsend Stockton, LLP

(57) ABSTRACT

Systems and methods for determining the configuration of a connection between two devices by measuring an electrical characteristic are provided. Using the measured electrical characteristic, a device is able to select an appropriate communication interface, such as serial, Universal Serial Bus (USB), FireWire, parallel, PS/2, etc., and configure itself appropriately. Systems and methods which determine the physical orientation of a connector with respect to another connector may also be provided alone or in combination with such systems and methods for selecting communication interfaces. The physical orientation of a connector can be determined by measuring an electrical characteristic and a device can then configure itself appropriately. In accordance with the principles of the present invention, device designs can decrease in size and cost as well as simplify operation for the end-user.

46 Claims, 11 Drawing Sheets

(56) References Cited

U.S. PATENT DOCUMENTS

| | | | | |
|---|---|---|---|---|
| 6,530,793 | B2 | 3/2003 | Eichhorn et al. | |
| 6,671,814 | B1 | 12/2003 | Kubo et al. | |
| 6,786,763 | B2 | 9/2004 | Wu | |
| 6,836,814 | B2 * | 12/2004 | Takaoka et al. | 710/316 |
| 6,846,202 | B1 | 1/2005 | Schmidt et al. | |
| 6,948,965 | B2 | 9/2005 | Kumamoto et al. | |
| 6,948,984 | B2 | 9/2005 | Chen et al. | |
| 6,962,510 | B1 | 11/2005 | Chen et al. | |
| 6,964,582 | B2 | 11/2005 | Zhuang et al. | |
| 6,973,658 | B2 * | 12/2005 | Nguyen | 719/327 |
| 6,981,887 | B1 | 1/2006 | Mese et al. | |
| 7,039,731 | B2 * | 5/2006 | Hasegawa | 710/38 |
| 7,058,075 | B1 * | 6/2006 | Wong et al. | 370/463 |
| 7,094,086 | B2 | 8/2006 | Teicher | |
| 7,094,089 | B2 | 8/2006 | Andre et al. | |
| 7,123,022 | B2 * | 10/2006 | Parker et al. | 324/538 |
| 7,160,125 | B1 | 1/2007 | Teicher | |
| 7,216,191 | B2 * | 5/2007 | Sagues et al. | 710/301 |
| 7,277,966 | B2 * | 10/2007 | Hanson et al. | 710/16 |
| 7,361,059 | B2 | 4/2008 | Harkabi et al. | |
| 7,363,947 | B2 | 4/2008 | Teicher | |
| 7,392,946 | B2 | 7/2008 | Hellström et al. | |
| 7,442,091 | B2 | 10/2008 | Salolmon et al. | |
| 7,458,825 | B2 | 12/2008 | Atsmon et al. | |
| 7,463,042 | B2 | 12/2008 | Pereira | |
| 7,496,671 | B2 * | 2/2009 | Engel et al. | 709/230 |
| 7,500,861 | B2 | 3/2009 | Harkabi et al. | |
| 7,537,471 | B2 | 5/2009 | Teicher | |
| 7,589,536 | B2 | 9/2009 | Terlizzi et al. | |
| 7,591,657 | B2 | 9/2009 | Teicher | |
| 7,594,827 | B2 | 9/2009 | Takamoto et al. | |
| 7,716,400 | B2 | 5/2010 | Raines | |
| 7,717,717 | B1 | 5/2010 | Lai | |
| 7,722,409 | B2 | 5/2010 | Takamoto et al. | |
| 7,863,906 | B2 | 1/2011 | Terlizzi et al. | |
| 7,890,284 | B2 | 2/2011 | Patterson et al. | |
| 7,892,014 | B2 | 2/2011 | Amidon et al. | |
| 8,277,258 | B1 | 10/2012 | Huang et al. | |
| 8,535,075 | B1 | 9/2013 | Golko et al. | |
| 8,686,600 | B2 | 4/2014 | Terlizzi et al. | |
| 2003/0068033 | A1 * | 4/2003 | Kiko | 379/413 |
| 2004/0023560 | A1 * | 2/2004 | Swoboda | 439/638 |
| 2005/0042930 | A1 | 2/2005 | Harkabi et al. | |
| 2005/0079738 | A1 | 4/2005 | Ahn | |
| 2005/0097212 | A1 * | 5/2005 | Engel et al. | 709/230 |
| 2005/0124217 | A1 | 6/2005 | Zhuang et al. | |
| 2005/0124218 | A1 | 6/2005 | Chen et al. | |
| 2005/0124219 | A1 | 6/2005 | Chen et al. | |
| 2005/0251589 | A1 | 11/2005 | Wang | |
| 2006/0019545 | A1 | 1/2006 | Moriyama et al. | |
| 2006/0024997 | A1 | 2/2006 | Teicher | |
| 2006/0047982 | A1 * | 3/2006 | Lo et al. | 713/300 |
| 2006/0294272 | A1 | 12/2006 | Chou et al. | |
| 2007/0001691 | A1 * | 1/2007 | Pereira | 324/754 |
| 2007/0010115 | A1 | 1/2007 | Teicher | |
| 2007/0010116 | A1 | 1/2007 | Teicher | |
| 2007/0178771 | A1 | 8/2007 | Goetz et al. | |
| 2007/0202725 | A1 | 8/2007 | Teicher | |
| 2007/0245058 | A1 | 10/2007 | Wurzburg et al. | |
| 2007/0287302 | A1 | 12/2007 | Lindberg et al. | |
| 2008/0119076 | A1 | 5/2008 | Teicher | |
| 2008/0164934 | A1 | 7/2008 | Hankey et al. | |
| 2008/0274633 | A1 | 11/2008 | Teicher | |
| 2009/0108848 | A1 | 4/2009 | Lundquist | |
| 2009/0149049 | A1 | 6/2009 | Harkabi et al. | |
| 2009/0267613 | A1 | 10/2009 | Terlizzi et al. | |
| 2010/0080563 | A1 | 4/2010 | DiFonzo et al. | |
| 2010/0235546 | A1 | 9/2010 | Terlizzi et al. | |
| 2010/0262744 | A1 | 10/2010 | Deva et al. | |
| 2010/0279554 | A1 | 11/2010 | Steijner | |
| 2011/0126005 | A1 | 5/2011 | Carpenter et al. | |
| 2012/0270419 | A1 | 10/2012 | Shahoian et al. | |
| 2013/0075149 | A1 | 3/2013 | Golko et al. | |
| 2013/0078869 | A1 | 3/2013 | Golko et al. | |
| 2013/0089291 | A1 | 4/2013 | Jol et al. | |
| 2013/0095701 | A1 | 4/2013 | Golko et al. | |
| 2013/0095702 | A1 | 4/2013 | Golko et al. | |
| 2013/0115817 | A1 | 5/2013 | Terlizzi et al. | |
| 2013/0117470 | A1 | 5/2013 | Terlizzi et al. | |
| 2013/0217253 | A1 | 8/2013 | Golko et al. | |
| 2013/0244489 | A1 | 9/2013 | Terlizzi et al. | |

FOREIGN PATENT DOCUMENTS

| | | | |
|---|---|---|---|
| EP | 2169774 | A1 | 3/2010 |
| FR | 2138961 | A1 | 6/1973 |
| JP | 6155974 | A | 1/1994 |
| JP | 2003-217728 | A | 7/2003 |
| WO | WO 2005/013436 | A1 | 2/2005 |
| WO | WO 2006/013553 | A2 | 2/2006 |
| WO | WO 2008/065659 | A2 | 6/2008 |
| WO | WO 2009/069969 | A2 | 6/2009 |
| WO | 2011150403 | A1 | 12/2011 |
| WO | 2012103383 | A2 | 8/2012 |
| WO | 2013070753 | A2 | 5/2013 |

OTHER PUBLICATIONS

Non-Final Office Action for U.S. Appl. No. 13/679,637, mailed Apr. 22, 2013, 37 pages.

Non-Final Office Action for U.S. Appl. No. 13/721,522, mailed May 22, 2013, 27 pages.

Non-Final Office Action for U.S. Appl. No. 13/232,978 mailed on Sep. 17, 2013, 44 pages.

Final Office Action for U.S. Appl. No. 13/232,978 mailed on May 29, 2014, 9 pages.

* cited by examiner

SYSTEMS AND METHODS FOR DETERMINING THE CONFIGURATION OF ELECTRONIC CONNECTIONS

Matter enclosed in heavy brackets [ ] appears in the original patent but forms no part of this reissue specification; matter printed in italics indicates the additions made by reissue.

BACKGROUND OF THE INVENTION

The present invention relates to electronic connections. More particularly, the present invention relates to systems and methods for determining the configuration of electronic connections.

Many devices are capable of communicating with other devices through the use of more than one communication interface. For example, a computer uses different interfaces for communicating with a monitor, a keyboard, and other computers on a network. In the case of a computer, each interface usually has its own, dedicated connector. However in some devices, for example portable electronics, it may be advantageous to have one connector that is capable of communicating using more than one type of interface.

This is particularly true as portable electronic devices become smaller, because the physical size and number of connectors becomes an important factor. The size of connector contacts cannot get much smaller due to manufacturing and power transmission issues. Therefore, engineers try to reduce the number of connectors by incorporating the signals needed for each different interface into a single connector. This typically results in a larger connector with redundant contacts that are only used for certain interfaces.

Thus, it would be advantageous to be able to use individual connector contacts for more than one interface. The more contacts that have multiple functions, the smaller the connector can be. In order for a contact to carry more than one type of signal, a device must be able to identify the interface being used and route the signal appropriately.

Many connectors and their housings are designed so that they can only be coupled in a certain configuration. This design process is commonly referred to as "keying" a connector and can include, for example, using asymmetrical connector shapes. Connectors are typically designed this way so that it is impossible to connect the wrong contacts. This can be especially important when dealing with sensitive electronics that could be damaged by the application of a power supply line to the wrong contact. Often, the design of the connectors prevents them from being coupled in an incorrect orientation.

Coupling these types of connectors can be time-consuming for users. If connectors cannot be mated on the first try, users have to manipulate the connectors until they are correctly orientated with respect to each other. Depending on the keying, there may even be potential for the user to damage the pins of the connector in frustration while trying to force the connectors together. If a connector's pin configuration could be sensed and properly compensated for, connectors could be coupled in more than one orientation, thereby simplifying the process for an end user. Therefore, it is desirable to provide systems and methods for determining a connector's orientation. Further, it is also desirable to combine systems and methods for selecting a communication interface with those for determining a connector's orientation.

Further limitations and disadvantages of conventional and traditional approaches will become apparent to one of skill in the art, through comparison of such systems with some aspects of the present invention as set forth in the remainder of the present application with reference to the drawings.

SUMMARY OF THE INVENTION

Systems and methods for determining the configuration of electronic connections by measuring an electrical characteristic of a connection are provided. Using the measured electrical characteristic, a device is able to select an appropriate communication interface, such as serial, Universal Serial Bus (USB), FireWire, parallel, PS/2, etc. Once the appropriate communication interface has been selected, the device can subsequently configure itself to communicate using the selected interface. In accordance with the principles of the present invention, one connector can facilitate communication using multiple interfaces. This could allow a device with a single connector to communicate with multiple types of devices. This one-connector approach saves both space and money, as well as making the act of mating two connectors easier for the end user.

Systems and methods which determine the physical orientation of a connector may also be provided alone or in combination with such systems and methods for selecting communication interfaces. In accordance with the principles of the present invention, symmetrical connectors with multiple mating configurations can be used. A device can determine the orientation of a connector relative to another connector and properly route the signals from a connector according to the detected orientation. This type of design can save the end user time and frustration when coupling connectors together.

BRIEF DESCRIPTION OF THE DRAWINGS

The above and other features of the present invention, its nature, and various advantages will be more apparent upon consideration of the following detailed description, taken in conjunction with the accompanying drawings.

DETAILED DESCRIPTION OF THE INVENTION

Many electronic communication interfaces exist. Devices communicate using, for example, parallel, serial, PS/2, Universal Serial Bus (USB), and FireWire interfaces. Devices which communicate over more than one interface typically have a separate connector for each interface. In order for a connector to facilitate communication using more than one type of interface, a system which selects appropriate communication interfaces can be used.

Figure 1:
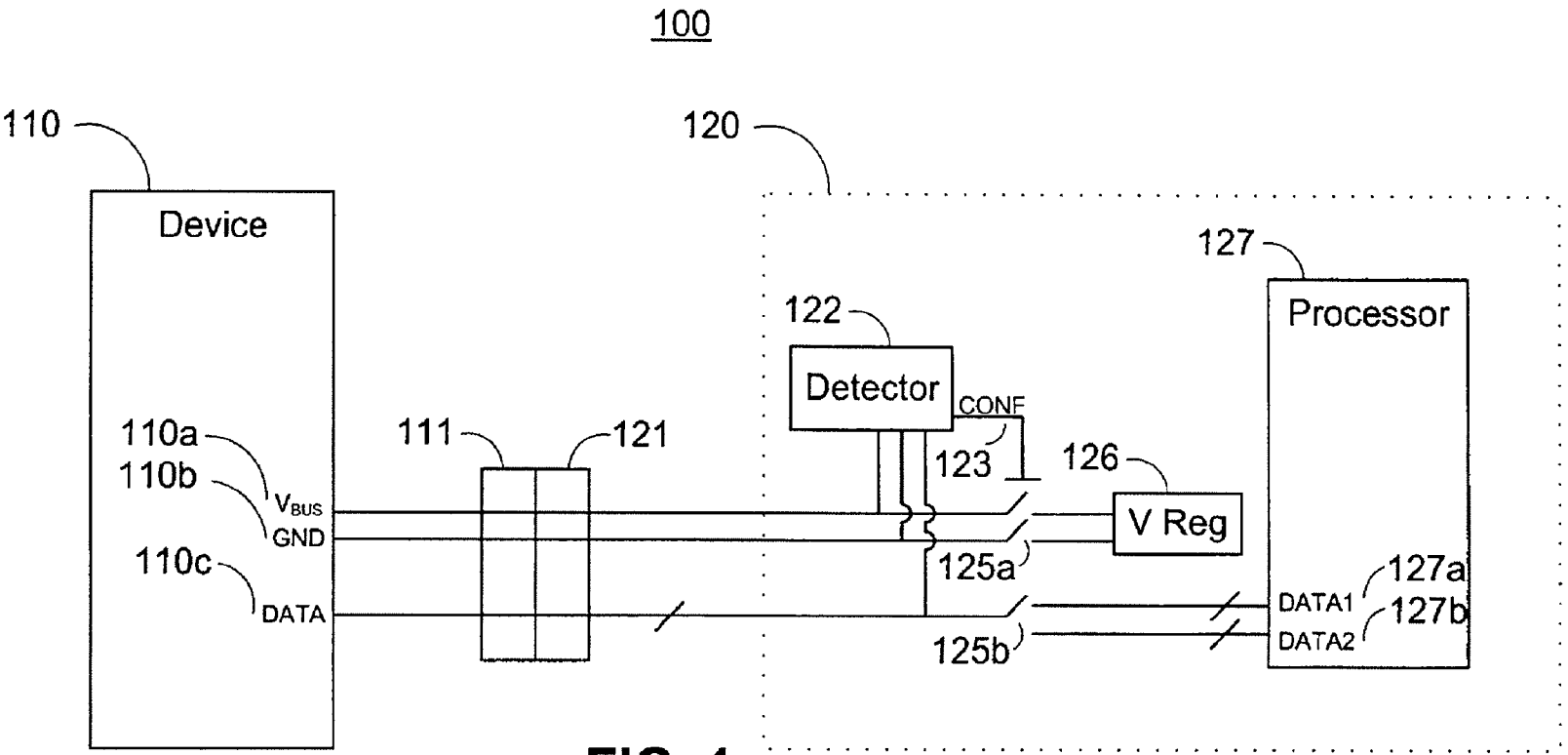
FIG. 1 is a simplified schematic system diagram of an embodiment of a system which can be operated in accordance with the principles of the present invention, wherein a switch is used to route signals to predetermined locations.

FIG. 1 includes an embodiment of a system 100 operable to select communication interfaces in accordance with the principles of the present invention. System 100 can include device 110 and device 120. Device 110 can be an electronic device operable to communicate with other electronic devices using an interface. Device 120 can be an electronic device operable to select the communication interface which device 110 is using and then communicate with device 110 using the selected interface. Device 120 can, for example, be operable to communicate using a Universal Serial Bus (USB) interface as well as an RS-232 serial interface.

Devices 110 and 120 can be coupled by, for example, lines 110a and 110b as well as data bus 110c. Line 110a can carry a supply voltage ($V_{BUS}$). Line 110b can carry a ground (GND) associated with supply voltage 110a. Data bus (DATA) 110c can include one or more lines that carry data to be exchanged between devices 110 and 120. DATA 110c can also include lines which carry transmission information, for example timing and control signals, which is pertinent to the communication interface being utilized. Lines which are part of the coupling between device 110 and 120 can also transmit other signals. Lines 110a, 110b, and 110c can be bound together in a cable or harness that couples devices 110 and 120. The coupling hardware can be a separate piece of equipment which may be detached from devices 110 and 120. Alternatively, the coupling hardware can be part of device 110 or device 120. Device 110 can, for example, plug into a socket on device 120.

Device 120 can include connector 121 to provide a physical connection of lines 110a, 110b, and 110c between device 110 and device 120. Connector 121 can include an electrical contact for each line connecting device 110 with device 120. Connector 121 can be, for example, a socket for receiving a plug. Connector 121 can be shaped to ensure that only devices with a complementary shape can be coupled to device 120. Connector 121 can include a conductive connector shell. The connector shell can be tied to, or replace, ground line 110b or circuit ground of device 120. Connector 121 can include a magnetic element to secure the connection between devices 110 and 120 in such a way that, if the wire running to device 110 is pulled, the connector simply detaches.

Device 120 can include detector 122. Detector 122 can be coupled to one or more of the lines that are part of the connection between devices 110 and 120 (e.g. $V_{BUS}$ 110a, GND 110b, DATA 110c). Detector 122 can be, for example, a distributed circuit, an Application-Specific Integrated Circuit (ASIC), or a Field-Programmable Gate Array (FPGA). Detector 122 can have additional functions, for example signal conditioning or power regulation. Detector 122 does not have to be coupled with every line connected between device 110 and device 120.

Detector 122 can be operable to measure one or more electrical characteristic of the connection between devices 110 and 120. The electrical characteristic measured by detector 122 can include, for example, a resistive, reactive, current, or voltage measurement and can involve one or more contacts. Detector 122 can, for example, measure the voltage of $V_{BUS}$ 110a relative to GND 110b. Alternatively, detector 122 can detect the resistance between a line of DATA bus 110c and GND 110b. In another embodiment, detector 122 can be coupled with the system clock of device 120 and can monitor the behavior of DATA 110c with respect to the system clock. It is contemplated that there are several different characteristics or combinations of characteristics that can be measured by detector 122 in order to select the appropriate communication interface.

In one embodiment, device 110 might be a device that uses a USB interface or a device that uses a low-voltage serial interface. If detector 122 can measure, for example, the voltage of $V_{BUS}$ 110a relative to GND 110b, detector 122 can select if device 110 is using a USB interface or a low-voltage serial interface. Because the USB standard calls for a power supply line with a voltage of 4.35V to 5.25V, a higher voltage would indicate a USB interface and a lower voltage, for example below 3V, would indicate a low-voltage serial interface.

Device 120 can include switches 125a and 125b. The inputs of switch 125a can be coupled with $V_{BUS}$ 110a and GND 110b. The inputs of switch 125b can be coupled with DATA 110c and other lines that are part of the connection between devices 110 and 120. Switches 125a and 125b can be in an open state by default. If switches 125a and 125b are in an open state by default, detector 122 can better measure characteristics of lines 110a-110c without any effects due to circuits in device 120.

From one or more measured characteristic, detector 122 can be operable to select the communication interface being used by device 110. Switches 125a and 125b can be controlled by detector 122 through a configuration signal (CONF) 123. Detector 122 can direct switch 125a to close once detector 122 has selected which communication interface device 110 is using. Detector 122 can direct switch 125b to move to a state corresponding to the selected communication interface. Because switches 125a and 125b are controlled by a signal from detector 122, switches 125a and 125b can also be referred to as relays.

Device 120 can include voltage regulator 126. Voltage regulator 126 can be coupled to the outputs of switch 125a so that when switch 125a is closed, voltage regulator 126 is connected to $V_{BUS}$ 110a and GND 110b. Voltage regulator 126 can, for example, include circuitry operable to charge a battery in device 110 from a power supply in device 120. In another embodiment, voltage regulator 126 can directly couple $V_{BUS}$ 110a with the voltage rail of device 120 and GND 110b with the common ground of device 120.

Device 120 can include processor 127. Processor 127 can be, for example, a microcontroller or an ARM processor. Processor 127 can be coupled with the system clock of device 120. Processor 127 can be capable of communicating over more than one interface. Processor 127 can have different input/output busses 127a and 127b for communicating over different interfaces. Processor 127 can be coupled to the outputs of switch 125b. The first outputs of switch 125b can be coupled to one bus (DATA1) 127a of processor 127 that corresponds to a particular interface. The second outputs of switch 125b can be coupled to a second bus (DATA2) 127b of processor 127 that corresponds to a different interface. Switch 125b can connect DATA 110c with DATA1 127a or DATA2 127b in order to facilitate communication using the detected interface. Processor 127 can proceed to communicate with device 110 using this interface. Processor 127 can also perform other functions which are inherent to device 120. Processor 127 can, for example, access flash memory and process audio signals.

Figure 2:
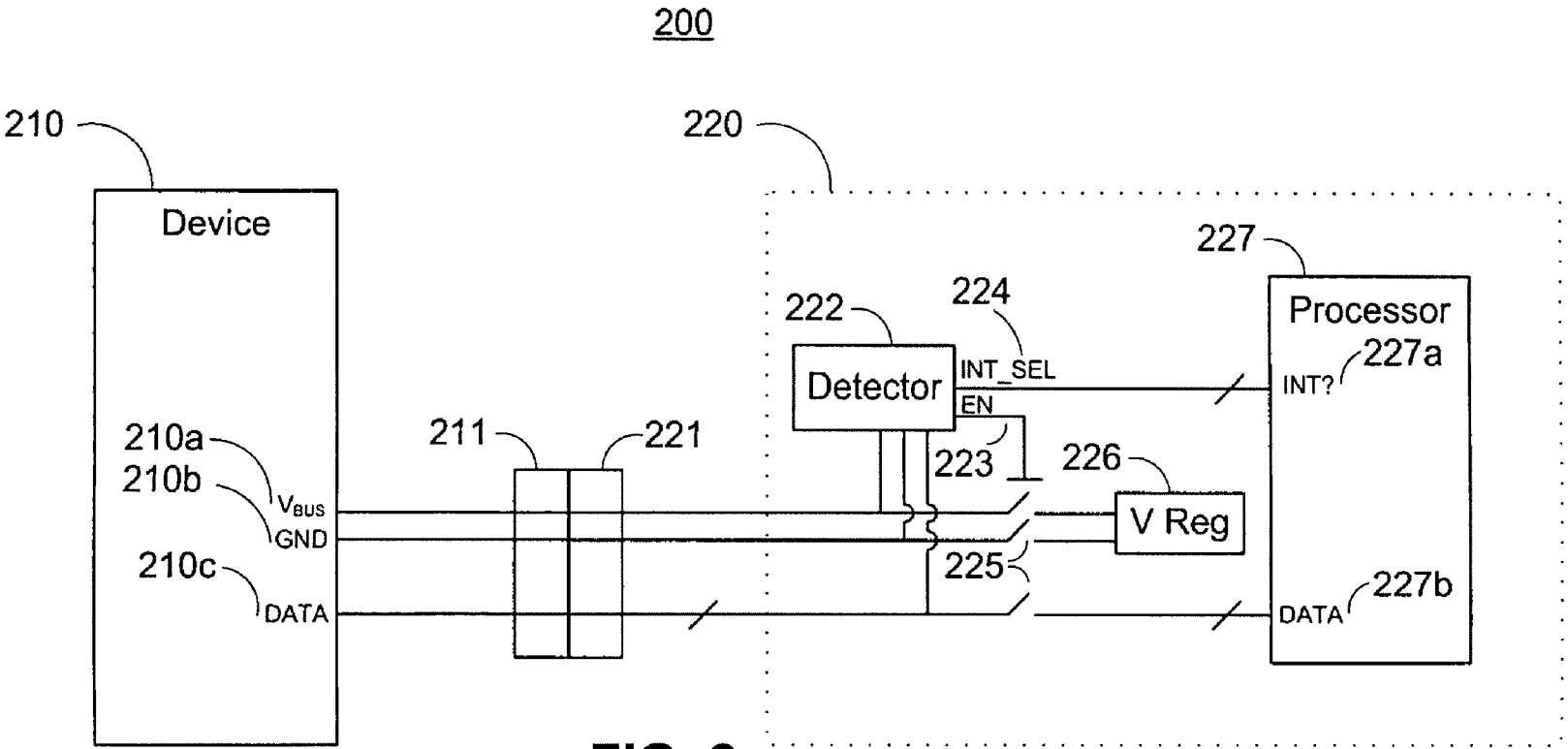
FIG. 2 is a simplified schematic system diagram of an embodiment of a system which can be operated in accordance with the principles of the present invention, wherein one or more signals are generated to indicate the interface.

FIG. 2 includes an embodiment of a system 200 operable to select a communication interface in accordance with the principles of the present invention. System 200 can include device 210 and device 220. Device 220 can include a detector 222. From one or more measured characteristic, detector 222 can be operable to select the communication interface being used by device 210. Other characteristics of device 210 can be identified by detector 222. For example, detector 222 can determine the charge-level of a battery within device 210.

Detector 222 can generate an interface select signal (INT_SEL) 224 which can indicate the interface that corresponds with the measured characteristic. INT_SEL 224 can include one or more lines and can transmit other information about device 210. For example. INT_SEL 224 can also transmit a low power warning or a device identification number.

Device 220 can include switch 225. Switch 225 can toggle $V_{BUS}$ 210a, GND 210b, DATA 210c, and other lines that are part of the connection between devices 210 and 220 between an open and closed state. Switch 225 can be in an open state by default. Switch 225 can be controlled by detector 222 through an enable signal (EN) 223. Detector 222 can direct switch 225 to close once detector 222 has selected which communication interface device 210 is using.

Device 220 can include a voltage regulator 226. Voltage regulator 226 can be coupled to switch 225 so that, when switch 225 is in a closed position, $V_{BUS}$ 210a and GND 210b can be connected to voltage regulator 226.

Device 220 can include processor 227. Processor 227 can be coupled with the system clock of device 220. Processor 227 can be coupled to switch 225 so that when the switch is closed DATA 210c is connected to a communication bus (DATA) 227b of processor 227. Processor 227 can monitor INT_SEL 224 to see what communication interface device 210 uses and configure itself or other circuitry accordingly. Processor 227 can configure itself by loading a set of instructions that correspond to a communication interface used by device 210.

DATA bus 227b of processor 227 can be designed so that each different interface uses all of the lines that make up DATA bus 227b. This design allows for efficient use of the input/output pins on processor 227. In one embodiment, device 210 might be a device that uses a USB interface or a device that uses a three-wire serial interface. According to the present standard, USB communications require four lines: a power supply line, a ground line, and two data lines. The current three-wire serial (RS-232) standard requires three lines: transmit data, receive data, and ground. A power supply line can also be included with a three-wire serial connection to allow the devices to share power. With an additional power supply line, the USB connection and the serial connection can both include four wires. In this case, no lines of DATA bus 227b would go unused regardless of the interface. In other embodiments, one interface could use less lines than another interface and some lines of DATA bus 227b could go unused for certain interfaces.

It is contemplated that processor 227 can reconfigure elements of device 220 not only in order to use a communication interface but also for the processing of data associated with that interface. For example, if Interface X is typically used to communicate with a microphone (not shown) then processor 227 can configure circuitry to communicate using Interface X and to further process voice data. In one embodiment, processor 227 can reprogram an FPGA in device 220 according to data from INT_SEL 224.

Figure 3:
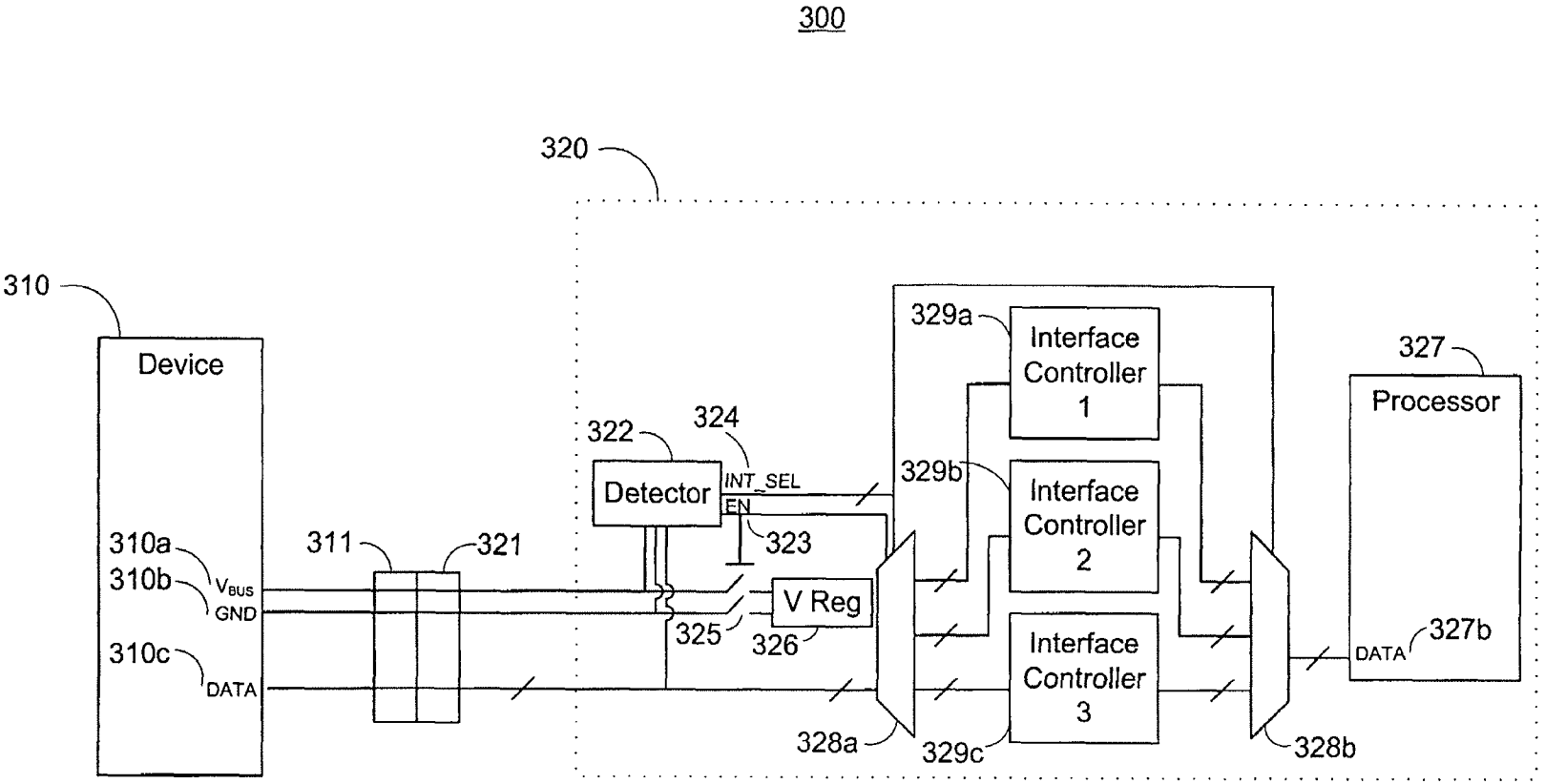
FIG. 3 is a simplified schematic system diagram of an embodiment of a system which can be operated in accordance with the principles of the present invention, wherein signals are routed to circuits corresponding to each interface.

FIG. 3 includes another embodiment of a system 300 operable to select a communication interface in accordance with the principles of the present invention. System 300 can include device 310 and device 320. Device 320 can include detector 322, switch 325, input multiplexer (MUX1) 328a, interface controllers 329a-329c, output multiplexer (MUX2) 328b, and processor 327. From one or more measured characteristics, detector 322 can be operable to select the communication interface being used by device 310. Once an appropriate communication interface is selected, multiplexers 328a and 328b can route DATA 310c through one of the interface controllers 329a-329c in order to facilitate communication between device 310 and device 320. Interface controllers 329a-329c can be circuits operable to coordinate communication between device 310 and circuitry in device 320 (e.g. processor 327, etc.). Interface controllers 329a-329c can be integrated into one or more ASICs. It is also contemplated that more than three interface controllers can be used if needed.

The input of MUX1 328a can be coupled to DATA 310c and other lines that are part of the connection between devices 310 and 320. MUX1 328a can be controlled by detector 322 through EN 323 and INT_SEL 324. EN 323 can be coupled to the enable line of MUX1 328a. INT_SEL 324 can be coupled to the select line of MUX1 328a. Each interface controller 329a-329c can be coupled to a different set of MUX1's 328a outputs.

Once detector 322 selects which communication interface device 310 is going to use, detector 322 can direct MUX1 328a to route its input to the corresponding interface controller with INT_SEL 324. It is contemplated that interface controllers 329a-329c can be powered off by default, and the appropriate controller can be turned on by a signal from detector 322. The outputs of interface controllers 329a-329c can be coupled with the inputs of MUX2 328b. INT_SEL 324 can be coupled to the select line of MUX2 328b. INT_SEL 324 can control MUX2 328b in order to connect the outputs from the appropriate controller to a communication bus (DATA) 327a of processor 327. Once connected, the appropriate interface controller can initialize communications with device 310. What this means is that, an interface controller may take certain steps, commonly called a "handshake" procedure, to begin communicating with device 310. These handshake procedures can be different for each type of interface.

Once MUX1 328a, interface controllers 329a-329c, and MUX2 328b are properly configured, detector 322 can use EN 323 to close switch 325 and enable MUX1 328a. In this embodiment, enabling MUX1 328a corresponds to closing switch 225 of the embodiment in FIG. 2. Once MUX1 328a is enabled, DATA 310c can be routed through one of interface controllers 329a-329c according to the selected interface. Each interface controller can be designed to process a different interface and can subsequently transmit that data to processor 327. Interface controllers 329a-329c can be operable to process signals transmitted both to and from processor 327. It is contemplated that in order to facilitate communicating with processor 327, the interface controllers can be connected to the same clock signal as processor 327. This clock signal can be used to coordinate the timing of the communications between the interface controllers 329a-329c and the processor 327.

A person skilled in the art will appreciate that selecting communication interfaces in accordance with the principles of the present invention can be practiced by other than the described embodiments, which are presented for purposes of illustration rather than of limitation. For example, a system which routes lines to independent subsystems depending on the selected interface is another embodiment operable to function in accordance with the principles of the present invention.

Figure 4:
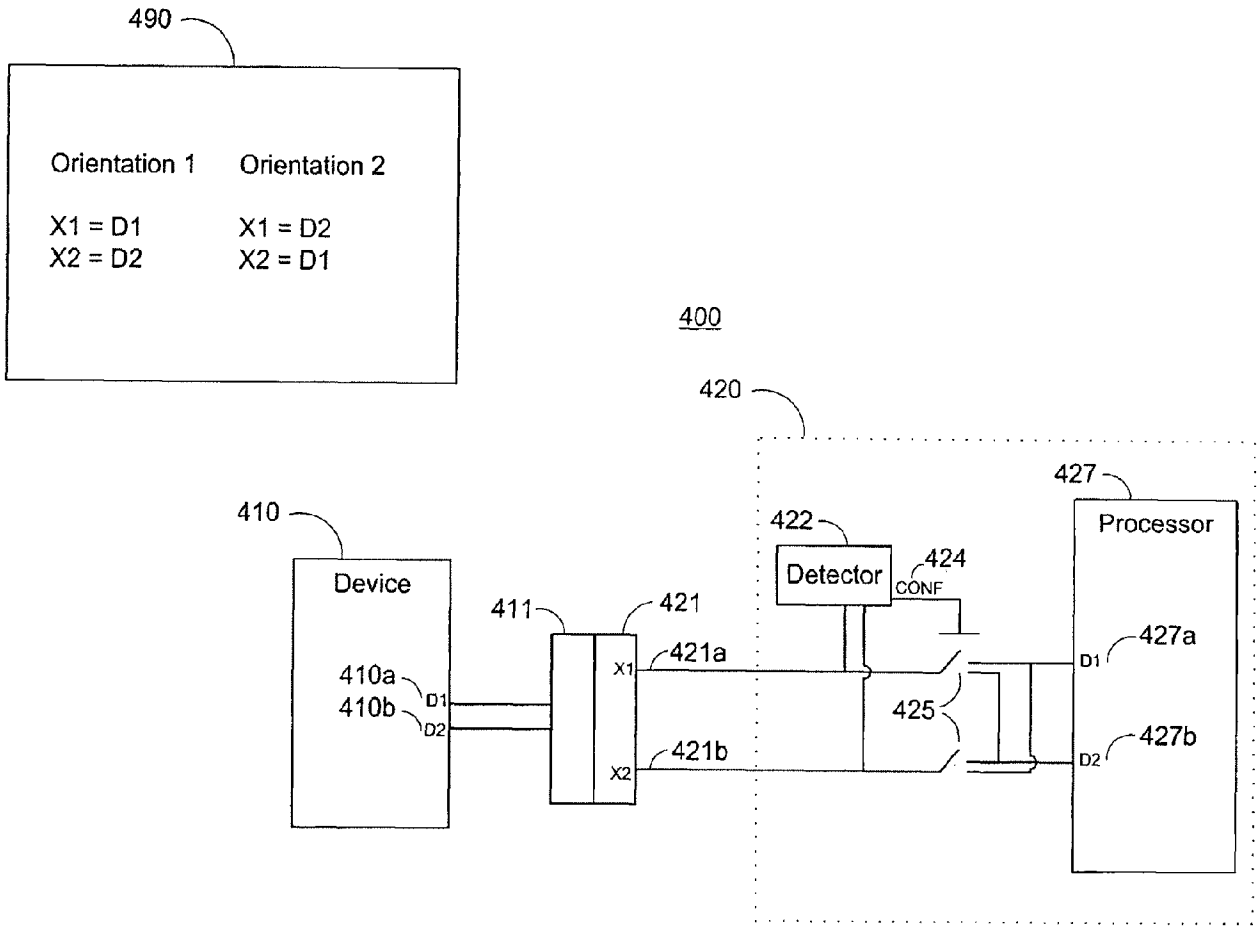
FIG. 4 is a simplified schematic system diagram of an embodiment of a system which can be operated in accordance with the principles of the present invention, wherein the orientation of a two-wire connector is determined.

FIG. 4 includes an embodiment of system 400 operable to determine connector orientation in accordance with the principles of the present invention. System 400 can include device 410 and device 420. Device 410 can include connector 411, and device 420 can include connector 421. Devices 410 and 420 can be coupled by mating connectors 411 and 421. Mating connectors 411 and 421 can connect power supply lines, data busses, and other types of signals between devices 410 and 420. Mating connectors 411 and 421 can include coupling contacts for two or more physical connections between device 410 and device 420 even though only two are shown in FIG. 4. Connectors 411 and 421 can be symmetrical so that connectors 411 and 421 can be mated in two possible different physical orientations.

Legend 490 lists two possible physical connector orientations. In Orientation 1, line X1 421a can be connected to D1 410a and line X2 421b can be connected to line D2 410b. In Orientation 2, line X1 421a can be connected to D2 410b and line X2 421b can be connected to D1 410a. The actual physical orientation of the connectors can be determined by detector 422 in device 420.

Device 420 can include detector 422 which can be coupled to lines 421a and 421b. From one or more measured characteristics, detector 422 can be operable to determine the physical orientation of connector 411 with respect to connector 421. Detector 422 can, for example, measure the voltage of line X1 421a with respect to line X2 421b. In this example, the measured voltage can be used to determine whether connectors 411 and 421 are in a first or second physical orientation with respect to each other. Device 420 can include switch 425. Switch 425 can be operable to exist in one of three states: open, connecting its inputs to a first set of outputs, and connecting its inputs to a second set of outputs. The first outputs can be connected to input/output lines of processor 427 so that X1 421a can be connected to D1 427a and X2 421b can be connected to D2 427b. The second outputs can be connected to processor 427 so that X1 421a can be connected to D2 427b and X2 421b can be connected to D1 427a.

Switch 425 can be coupled with detector 422. Before the physical orientation of connector 411 is determined, switch 425 can be in an open position so that any circuits in device 420 do not affect the measurements made by detector 422. Once the orientation has been determined, detector 422 can signal switch 425 with a configuration signal (CONF) 424. Switch 425 can then connect the lines from device 410 to circuitry in device 420 according to the physical orientation between the connectors. For example, switch 425 can go to a first position which connects X1 421a with D1 427a and X2 421b with D2 427b if Orientation 1 is detected. If Orientation 2 is detected, switch 425 can go to a second position which connects X1 421a with D2 427b and X2 with D1 427a.

Figure 5:
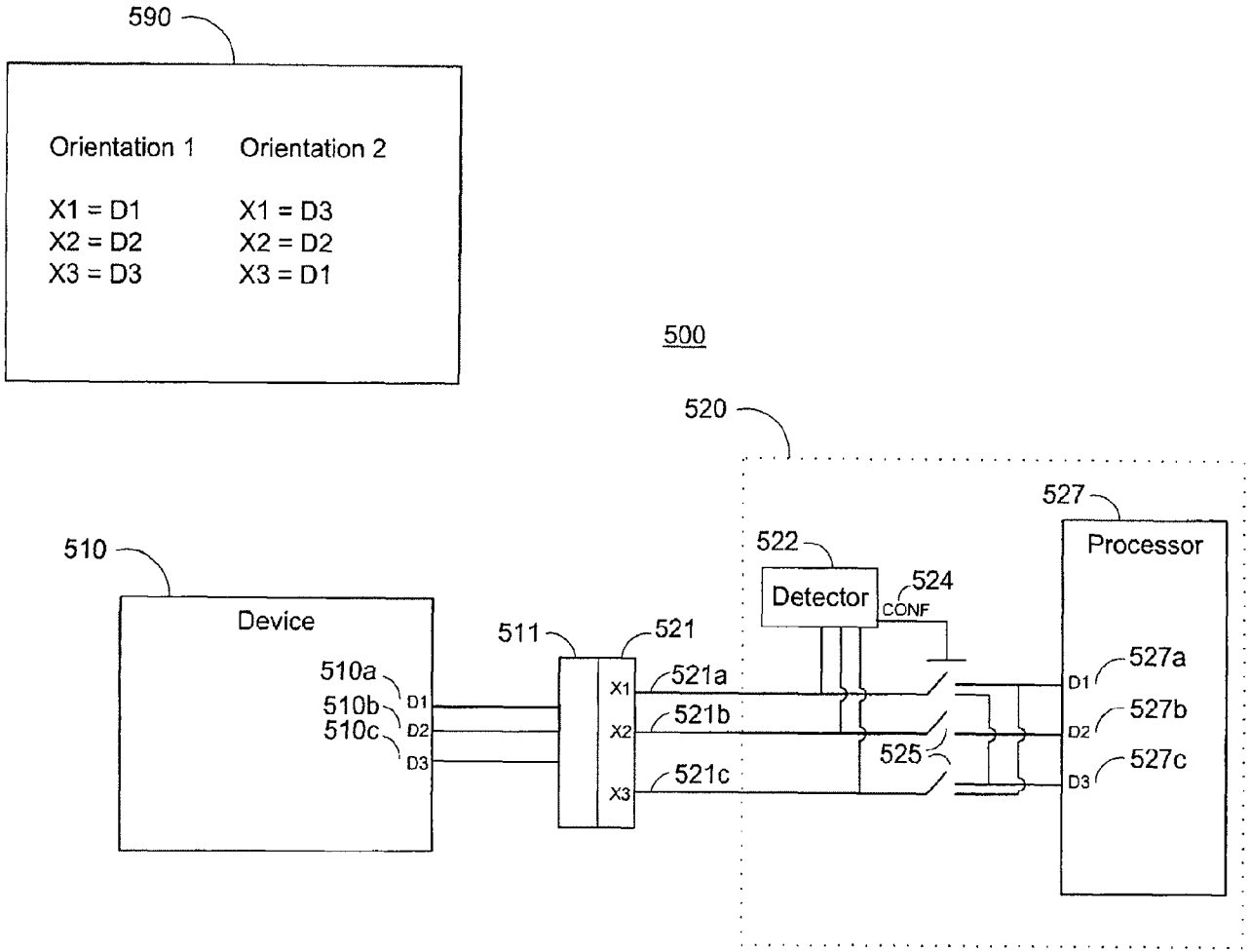
FIG. 5 is a simplified schematic system diagram of another embodiment of a system which can be operated in accordance with the principles of the present invention, wherein the orientation of a three-wire connector is determined.

FIG. 5 includes an embodiment of system 500 operable to determine the physical connector orientation in accordance with the principles of the present invention. System 500 can include device 510 and device 520. Device 510 can include connector 511, and device 520 can include connector 521. Devices 510 and 520 can be coupled by mating connectors 511 and 521. Mating connectors 511 and 521 can include connecting contacts for three lines between device 510 and device 520. Connectors 511 and 521 can be symmetrical so that connectors 511 and 521 can be connected in two possible orientations. Legend 590 shows two possible physical orientations of connector 511 with respect to 521. If there are an odd number of lines coupled between device 510 and device 520, a middle contact can be connected to the same signal in either connection orientation. For example, X2 521b can be connected to D2 510b regardless of connector orientation. Detector 522 measures one or more electrical characteristic of one or more of lines 521a-521c in order to determined whether connector 511 is in Orientation 1 or Orientation 2.

Once the orientation of connector 511 is determined, detector 522 can use configuration signal (CONF) 524 to trigger switch 525 to connect its outputs to the appropriate inputs of processor 527. In an embodiment where there are an odd number of contacts, a switch coupled with a middle line can have only an open and a closed position.

It is contemplated that connectors 511 and 521 can have a triangular shape enabling three different coupling orientations. In this case, device 520 can have switches capable of routing the lines from connector 521 to the proper lines within device 520. For example, the switches can have four possible positions which include an open position and individual positions for each connector orientation.

Figure 6:
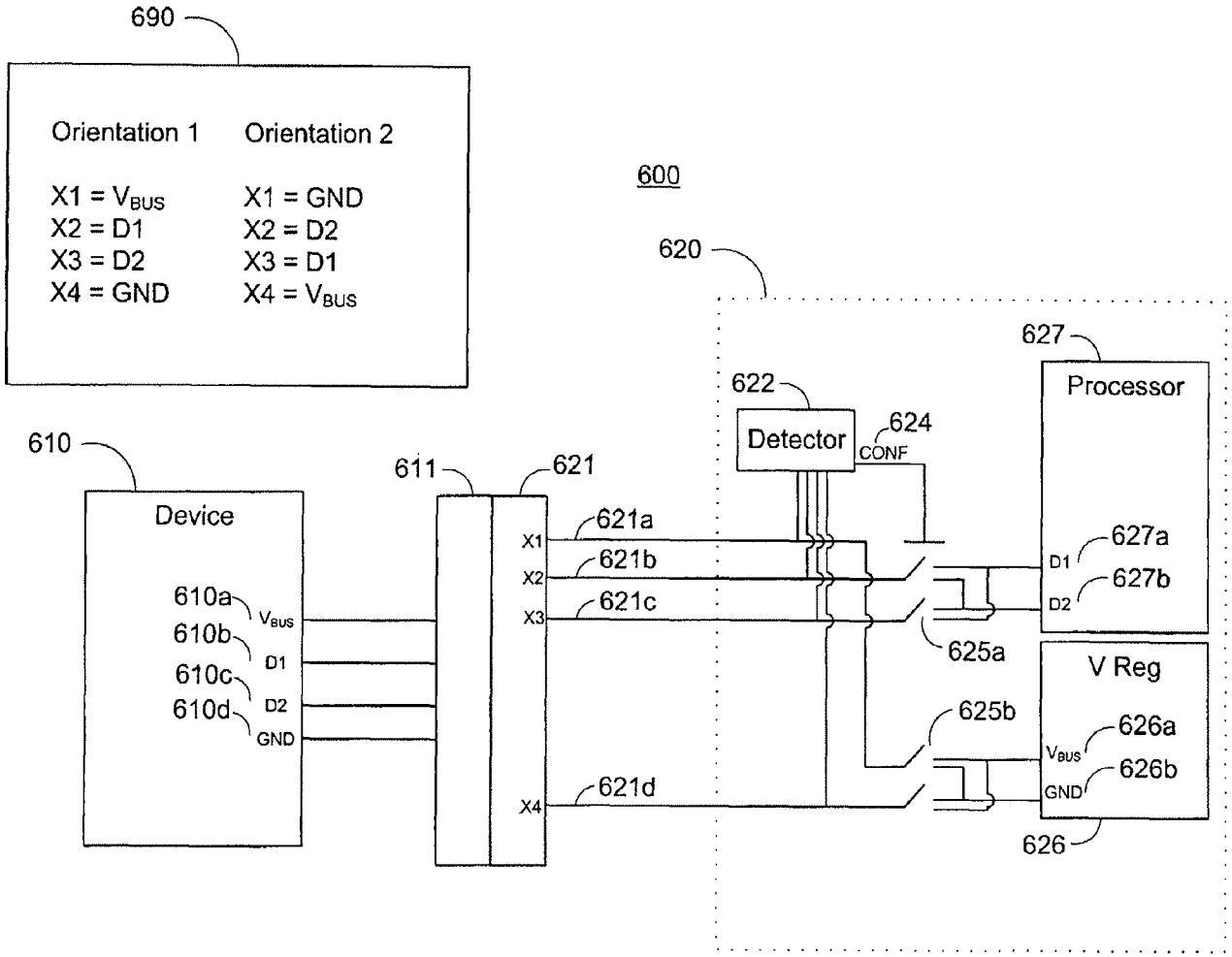
FIG. 6 is a simplified schematic system diagram of an embodiment of a system which can be operated in accordance with the principles of the present invention, wherein the orientation of a four-wire connector is determined.

FIG. 6 includes an embodiment of system 600 operable to determine connector orientation in accordance with the principles of the present invention. System 600 can include device 610 and device 620. Connectors 611 and 621 can be symmetrical so that two different mating configurations are possible. The connection between device 610 and device 620 can include four lines: a voltage line ($V_{BUS}$) 610a, a first data line (D1) 610b, a second data line (D2) 610c, and ground line (GND) 610d.

Two signals can be located on opposite contacts of the connection so that a line coining into device 620 is known to be one of those two signals. Legend 690 shows two possible physical orientations of connector 611 with respect to connector 621. For example, X1 621a is $V_{BUS}$ 610a in Orientation 1 and GND 610d in Orientation 2. In this example, there is no possibility that X1 621a is D1 610b or D2 610c. According to this same principle, a pair of lines can be known to contain two signals regardless of the connector orientation. For example, $V_{BUS}$ 610a and GND 610d can be connected to either X1 621a or X4 621d, but not to X2 621b or X3 621c, regardless of connector orientation.

Device 620 can include voltage regulator 626 and processor 627. A pair of lines which include $V_{BUS}$ 610a and GND 610d can be coupled with the inputs of switch 625b. The outputs of switch 625b can be coupled with voltage regulator 626. The pair of lines which include D1 610b and D2 610e can be coupled with the inputs of switch 625a, and the outputs of switch 625a can be coupled with the inputs of processor 627.

Detector 622 can be operable to measure one or more electrical characteristic of one or more of lines 621a-621d. From the one or more measured characteristic, the orientation of connector 611 with respect to connector 621 can be determined. Detector 622 can control switches 625a and 625b using configuration signal (CONF) 624 so that the switches make the proper connections corresponding to the detected orientation. For example, detector 622 can measure the voltage on line X1 621a and can find it to be consistent with the expected voltage of $V_{BUS}$ 610a. In this case, detector 622 can direct switches 625a and 625b to move to a position corresponding to Orientation 1. With switches 625a and 625b in this configuration, line 621a can be routed to $V_{BUS}$ 626a, line 621b can be routed to D1 627a, line 621c can be routed to D2 627b, and line 621d can be routed to GND 626b. Note that by measuring as few as one line which is indicative of the connectors' orientation, detector 622 can determine how to route all of the lines included in the connection.

It is contemplated that connectors 611 and 621 can be designed so that there are more than two possible connector mating orientations. For example, four contacts arranged so that each contact is a corner of a square would facilitate a connector that is capable of four different orientations. In a case where there are more than two possible orientations, it can not be correct to assume that a signal is found in one of two lines. In accordance with the principles of the present invention, switches with a different position for each orientation can be used in that situation.

A person skilled in the art will appreciate that determining connector orientation in accordance with the principles of the present invention can be practiced by other than the described embodiments, which are presented for purposes of illustration rather than of limitation. For example, a system which reconfigures a processor to compensate for connector orientation is another embodiment operable to function in accordance with the principles of the present invention.

Figure 7:
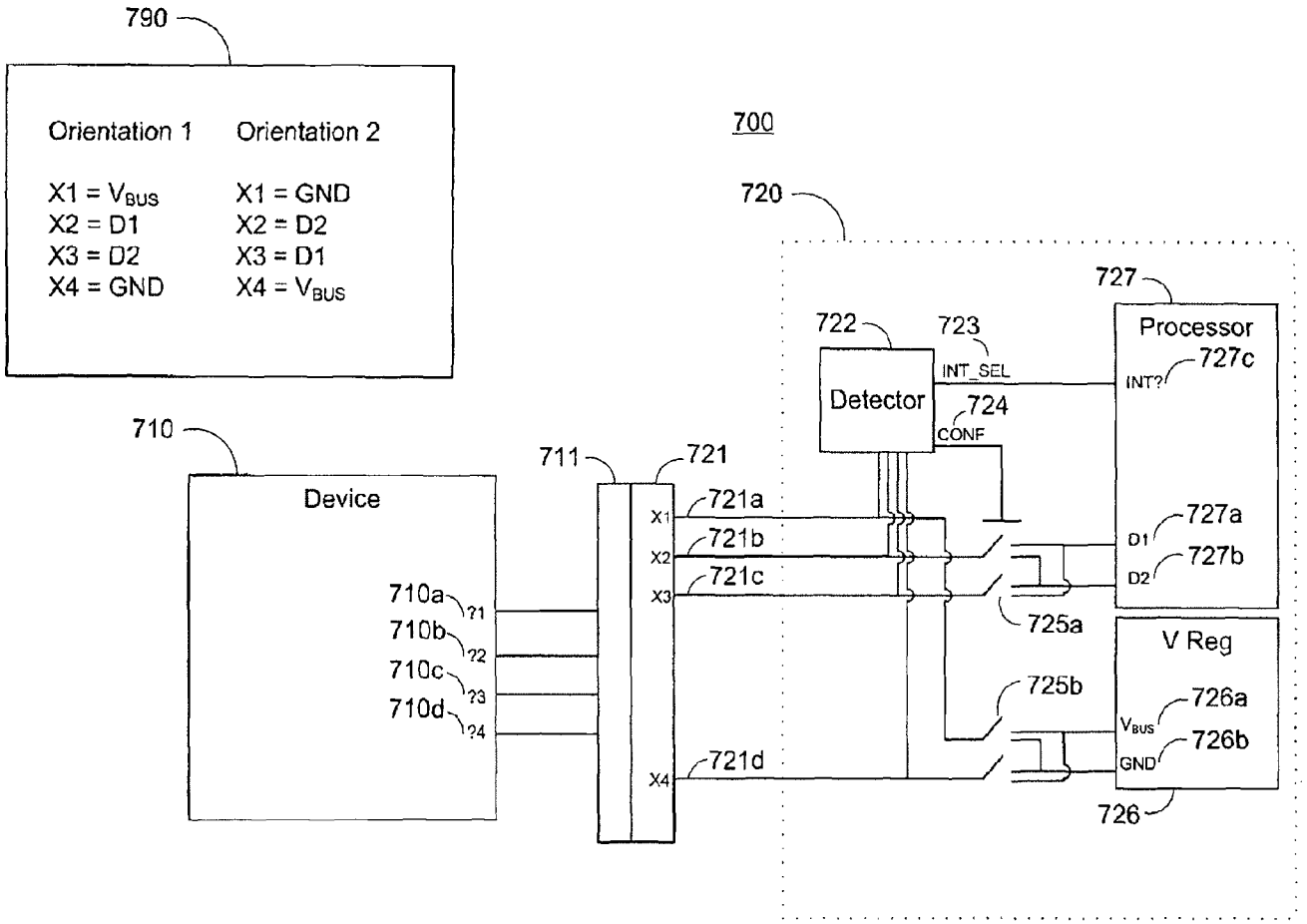
FIG. 7 is a simplified schematic system diagram of an embodiment of a system which can be operated in accordance with the principles of the present invention, wherein the connector orientation is determined and a communication interface is selected.

FIG. 7 includes an embodiment of system 700 operable to determine connector orientations and select communication interfaces in accordance with the principles of the present invention. System 700 can include device 710 and device 720. Connectors 711 and 721 can be symmetrical so that two or more different mating configurations are possible. Legend 790 shows two possible physical orientations of connector 711 with respect to connector 721. Device 720 can be capable of communicating using different interfaces. In this embodiment, there can be a matrix of connector orientations and communication interfaces which define the connection between device 710 and device 720. What this means is that, in this example, two possible communication interfaces can be used in either Orientation 1 or Orientation 2. When determining connector orientation and selecting a communication interface, as in the embodiment shown in FIG. 7, there can be four possible configurations.

Device 720 can include detector 722 which is capable of determining the orientation of connector 711 with respect to connector 721 and selecting the communication interface compatible with device 710. Detector 722 can control switches 725a and 725b using configuration signal (CONF) 724 in order to configure device 720 for the detected connector orientation. Detector 722 can transmit an interface select signal (INT_SEL) 723 to processor 727 that identifies the communication interface used by device 710. Processor 727 can subsequently configure itself or other circuits in device 720 in order to communicate via the detected interface.

It is contemplated that detector 722 can make two different measurements in order to determine the connector orientation and select the appropriate communication interface. For example, detector 722 may include some inputs coupled to connection lines 721a-721d to the left of switches 725a-725b and other inputs connected to lines 727a-727b and 726a-726b to the right of switches 725a-725b. In this embodiment, detector 722 may use one criteria to determine the connector orientation before switches 725a-725b close. Subsequently, detector 722 may use another criteria to select the appropriate communication interface after switches 725a-725b have closed to the proper position which compensates for connector orientation.

A person skilled in the art will appreciate that the present invention can be practiced by other than the described embodiments, which are presented for purposes of illustration rather than of limitation. For example, a system which routes signals differently to compensate for both connector orientation and communication interface is another embodiment operable to function in accordance with the principles of the present invention.

Figure 8:
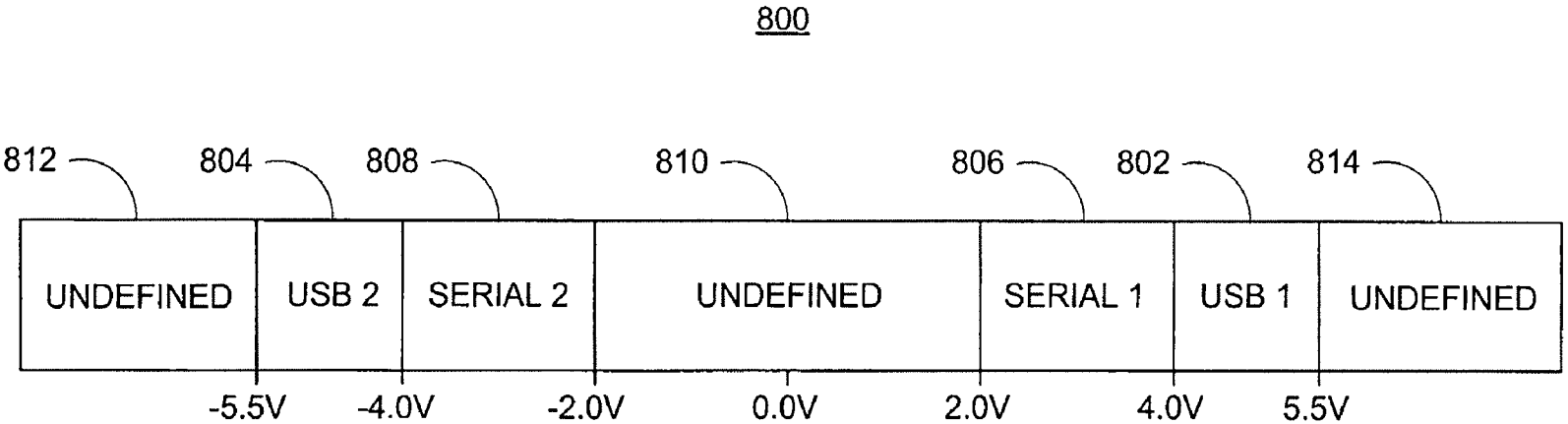
FIG. 8 is a simplified diagram of different voltage ranges that could be used to determine physical orientations and select communication interfaces in accordance with the principles of the present invention.

FIG. 8 is a simplified diagram 800 of voltage ranges measured by detector 722 and the corresponding interfaces and connector orientations. The measurement represented in diagram 800 is the voltage of line X1 with respect to line X3. Diagram 800 is illustrative of the embodiment where two possible communication interfaces, USB and three-wire serial, are used in combination with two possible connector orientations, but other implementations are possible that will still utilize the principles of the present invention.

The current USB standard calls for a power supply line with a voltage between 4.35V and 5.25V. Therefore range 802, which corresponds to a detected USB interface, extends from 4.0V to 5.5V. Range 804 includes the same range converted to negative voltages because it corresponds to a USB interface when the connectors are coupled in an opposite orientation.

Because the three-wire serial standard does not require a power supply line, the voltage of an optional power supply line can be designed to be different from the voltages of USB power supply lines. For example, the power supply line can be designed to have a voltage of 3.0V. In this embodiment, range 806 can extend front 2.0V to 4.0V and correspond to a detected serial interface. Range 808, which extends from −4.0V to −2.0V, can correspond to the same serial interface but with the connectors coupled in an opposite orientation.

Ranges 810, 812, and 814 can correspond to improperly coupled or unsupported connectors. In other embodiments, additional communication interfaces or connector orientations could correspond to ranges 810, 812, and 814.

Figure 9:
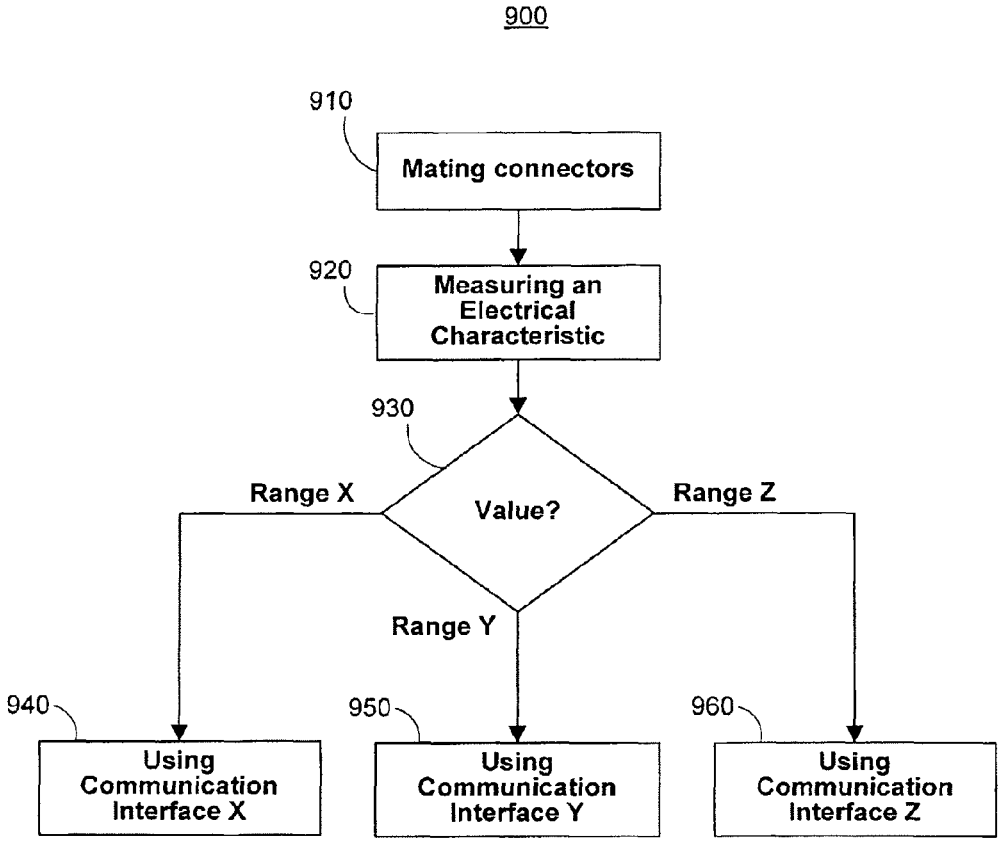
FIG. 9 is a flowchart of a method for selecting communication interfaces in accordance with the principles of the present invention.

FIG. 9 shows a flowchart of process 900 which can be implemented to select appropriate communication interfaces in accordance with the principles of the present invention. At step 910, two devices can be coupled by mating two connectors. This connection can include one or more electrical contacts. At step 920, one of the devices can measure one or more electrical characteristic of the connection. The electrical characteristic can include a resistive, reactive, current, or voltage measurement and can involve one or more contacts. In one embodiment, the measurement can be of the voltage of one contact with respect to another contact. In an alternative embodiment, the measurement can be of the resistance between two contacts.

Step 930 in process 900 depends on the measurement obtained at step 920. If the measurement is within a certain predetermined range, process 900 can continue with step 940. If the measurement is within a different predetermined range, process 900 can continue with step 950. If the measurement is within a third predetermined range, process 900 can continue with step 960. Each different range can correspond to a measurement that would be expected for a different communication interface. The number of different branches of process 900 can be defined by the number of interfaces a device can use to communicate.

In one embodiment, process 900 can repeat step 920 if the measurement does not fall into any of the predetermined ranges (not shown). In another embodiment, process 900 can resolve that same situation by prompting a user (not shown). The user prompt could, for example, request that the user check the connection or allow the user to select the interface type.

At step 940, 950 or 960, the device which performed the measurement can begin to use a predetermined communication interface which corresponds to the value of the measured characteristic. In order to use the selected interface, the device can load a corresponding set of instructions onto a processor. In an alternative embodiment, the device can route the signals to the corresponding circuits or ICs for each interface.

Figure 10:
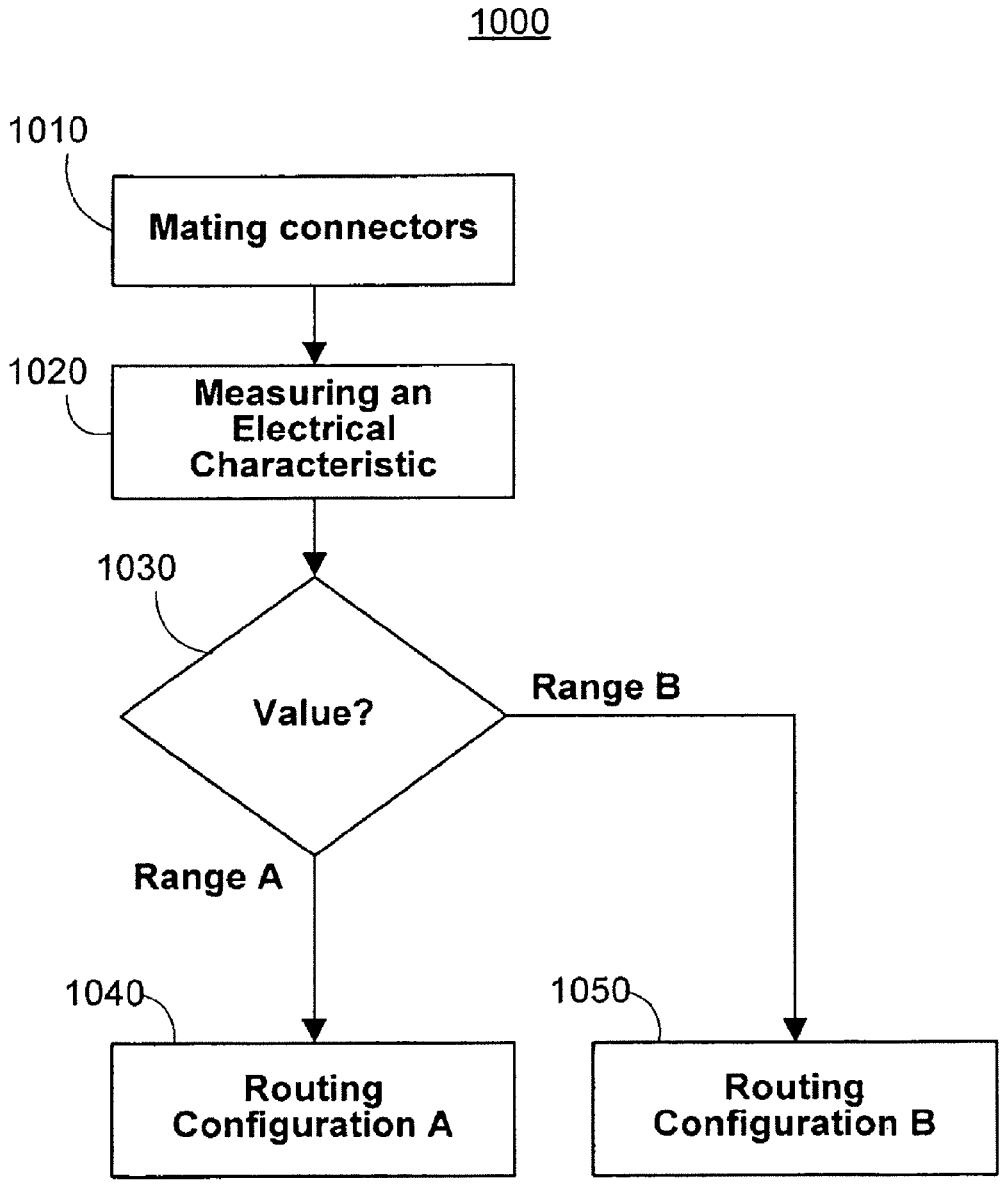
FIG. 10 is a flowchart of a method for determining connector orientations in accordance with the principles of the present invention.

FIG. 10 shows a flowchart of process 1000 which can be implemented to determine connector orientations in accordance with the principles of the present invention. At step 1010, two devices can be coupled by mating two connectors. The connectors used can be designed so that they can fit together in more than one physical orientation. At step 1020, one of the devices can measure an electrical characteristic of the connection.

At step 1030, process 1000 can proceed differently depending on the value of the measured characteristic. If the measured characteristic is within a predetermined range, process 1000 can proceed with step 1040. At step 1040, a device can route the connected lines to paths corresponding to Range A. If the measured characteristic is within a second range, process 1000 can proceed with step 1050. At step 1050, the connected lines can be routed to paths corresponding to Range B. The ranges can be selected so as to differentiate between possible connector orientations. For example, a device can measure the voltage of a line that is expected to be either a power supply line or ground depending on the physical orientation of the connectors. In this example, two possible voltage ranges can be separated at a value that is in between the expected supply voltage and ground.

Figure 11:
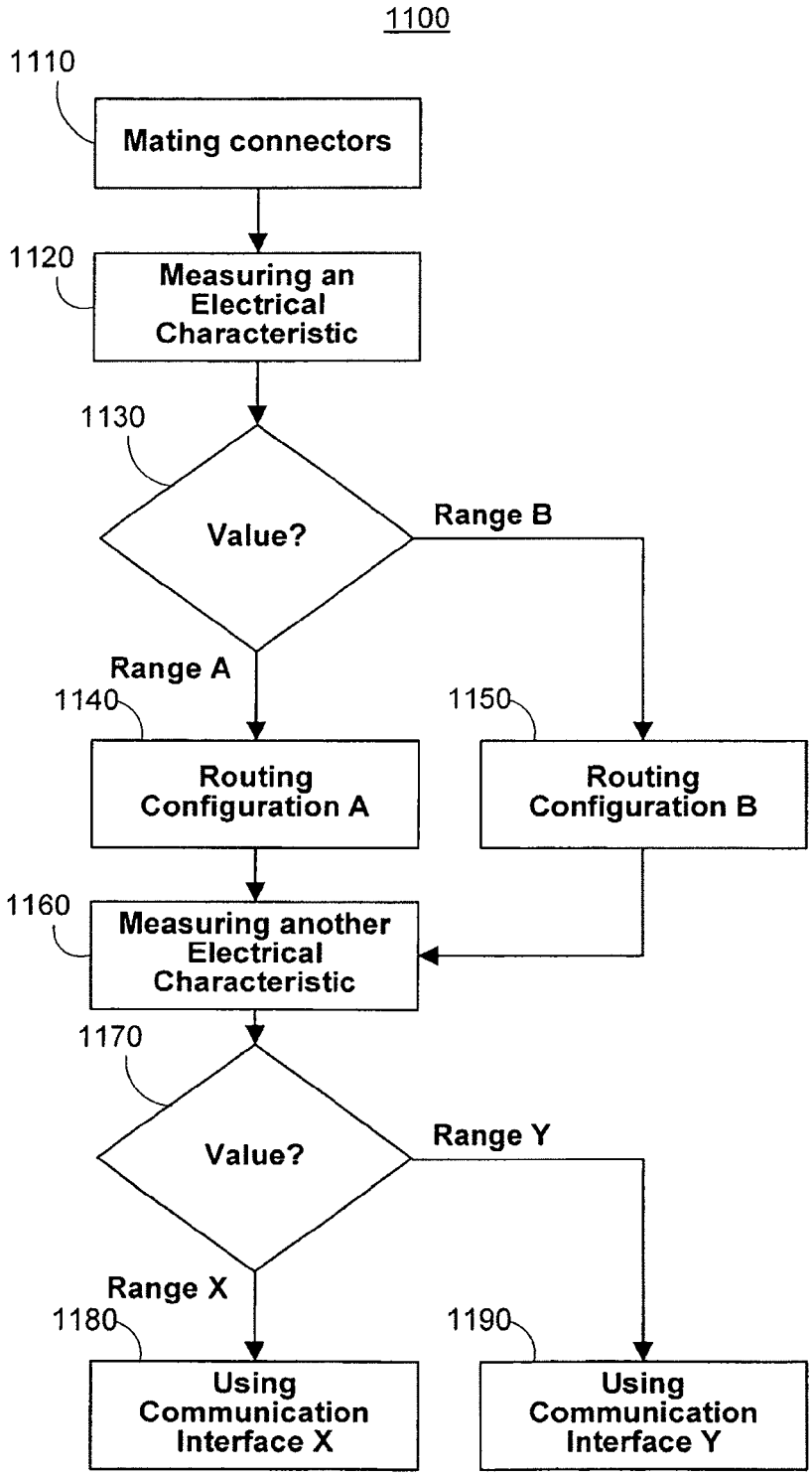
FIG. 11 is a flowchart of a method for determining connector orientations and selecting communication interfaces in accordance with the principles of the present invention.

FIG. 11 shows a flowchart of process 1100 which can be implemented to determine connector orientations and select appropriate communication interfaces in accordance with the principles of the present invention. At step 1110, two devices can be coupled by mating two connectors. The connectors used can be designed so that they can fit together in more than one physical orientation. At step 1120, one of the devices can measure an electrical characteristic of the connection. At step 1130, process 1100 diverges. Depending on the characteristic measured at step 1120, process 1100 can proceed with step 1140 or step 1150. Step 1140 can correspond to routing connection lines in accordance with one connector orientation and step 1150 can correspond to routing connection lines according to another connector orientation. It is contemplated that more than two connector orientations can be used in accordance with the principles of the present invention.

At step 1160 a device can measure one or more electrical characteristic. The measured characteristic can be used to select the communication interface appropriate for the two devices to use when communicating with each other. It is also contemplated that, instead of making a new measurement, the measurement generated at step 1120 can be used to select an appropriate communication interface at step 1170 without departing from the spirit of the present invention. Depending on the range of the measured characteristic, process 1100 can proceed with step 1180 or step 1190. At step 1180, the devices can communicate using Interface X. At step 1190, the devices can communicate using Interface Y. In order to communicate using the appropriate interface, a device can, for example, route the connection lines to the proper circuitry for that interface. Alternatively, a device can load a set of instructions specialized for communicating with the appropriate interface.

Thus it is seen that descriptions of systems and methods for determining connector orientations and selecting communication interfaces are provided. A person skilled in the art will appreciate that the present invention may be practiced by other than the described embodiments, which are presented for purposes of illustration rather than of limitation.

What is claimed is:

1. A method of selecting a serial communication interface comprising:

connecting a plurality of lines between a first device and a second device;

electrically coupling only a subset of the plurality of lines to circuitry within the second device;

measuring a characteristic of at least one line in the subset of the plurality of lines;

selecting an appropriate serial communication interface based on the measured characteristic;

configuring the second device so that it is operable to communicate using the selected serial communication interface, wherein configuring the second device comprises configuring a processor in the second device; and electrically coupling all of the plurality of lines to circuitry in the second device after the selecting.

2. The method of claim 1 wherein the measured characteristic is voltage.

3. The method of claim 1 wherein the selected serial communication interface is a Universal Serial Bus interface.

4. The method of claim 1 wherein the selected serial communication interface is an RS-232 serial interface.

5. The method of claim 1 wherein configuring the second device comprises:

routing lines between the first device and the second device according to the selected serial communication interface.

6. The method of claim 5 wherein the lines from the first device are routed to input/output lines of a processor in the second device which is operable to process the selected serial communication interface.

7. The method of claim 5 where in the lines from the first device are routed to circuitry operable to process the selected serial communication interface.

8. A method of determining the physical orientation of two connectors with respect to each other comprising:

connecting a first device to a second device by physically coupling a first connector to a second connector, wherein the connectors are capable of being coupled together in more than one physical orientation, and wherein connecting comprises electrically coupling a subset of a plurality of lines between the first and second devices, the subset being just the lines necessary to measure a characteristic of at least one line in the connection between the first connector and the second connector;

measuring the characteristic;

determining the physical orientation of the first connector with respect to the second connector based on the measured characteristic; and routing lines from the first device to the second device based on the determined physical orientation.

9. The method of claim 8 wherein the measured characteristic is voltage.

10. The method of claim 8 wherein the connectors comprise an odd number of lines and connecting comprises routing one of the lines between the first device and the second device the same way regardless of the determined physical orientation.

11. A method of determining the physical orientation of two connectors with respect to each other and selecting a serial communication interface comprising:

connecting a first device to a second device by physically coupling a first connector to a second connector, wherein the connectors are capable of being coupled together in more than one physical orientation, and wherein connecting comprises electrically coupling a subset of a plurality of lines between the first and second devices, the subset being just the lines necessary to measure a characteristic of at least one line in the connection between the first connector and the second connector;

measuring the characteristic;

determining the physical orientation of the first connector with respect to the second connector based on the measured characteristic;

selecting an appropriate serial communication interface based on the measured characteristic;

configuring the second device so that it is operable to communicate using the selected serial communication interface, wherein configuring the second device comprises configuring a processor in the second device; and routing lines from the first device to appropriate lines in the second device based on the determined physical orientation.

12. The method of claim 11 wherein the measured characteristic is voltage potential.

13. The method of claim 11 further comprising:

measuring a second characteristic of at least one line in the connection between the first connector and the second connector.

14. The method of claim 13 wherein the second measured characteristic is used to select an appropriate serial communication interface.

15. The method of claim 11 wherein the selected serial communication interface is a Universal Serial Bus interface.

16. The method of claim 11 wherein the selected serial communication interface is an RS-232 serial interface.

17. The method of claim 11 wherein configuring the second device comprises:

routing lines between the first device and the second device according to the selected serial communication interface.

18. The method of claim 17 wherein the lines from the first device are routed to input/output lines of a processor in the second device which is operable to process the selected serial communication interface.

19. The method of claim 17 wherein the lines from the first device are routed to circuitry operable to process the selected serial communication interface.

20. An apparatus for selecting a serial communication interface comprising:

a connector for coupling the apparatus with another device;

one or more contacts for physically connecting lines between the apparatus and the other device;

detector circuitry for measuring an electrical characteristic of at least one of the one or more contacts;

switch circuitry operable to connect at least one of the one or more contacts to other circuitry in one or more configurations;

control circuitry operable to interface the detector circuitry with the switch circuitry, wherein the detector circuitry selects a serial communication interface based on the measured characteristic and the control circuitry instructs the switch circuitry to configure itself accordingly; and a processor that is electrically coupled with the control circuitry, wherein the control circuitry instructs the processor to configure itself based on the selected serial communication interface.

21. The apparatus of claim 20 wherein the measured characteristic is voltage.

22. The apparatus of claim 20 wherein the measured characteristic is resistance.

23. An apparatus for determining the physical orientation of a connector comprising:

a connector for coupling the apparatus with another device;

one or more contacts for physically connecting lines between the apparatus and the other device;

detector circuitry for measuring an electrical characteristic of at least one of the one or more contacts;

switch circuitry operable to connect at least one of the one or more contacts to other circuitry in one or more configurations;

control circuitry operable to interface the detector circuitry with the switch circuitry, wherein the detector circuitry determines the physical orientation of the connector based on the measured characteristic and the control circuitry instructs the switch circuitry to configure itself accordingly; and a processor that is electrically coupled with the control circuitry, wherein the control circuitry instructs the processor to configure itself based on the determined physical orientation of the connector.

24. The apparatus of claim 23 wherein the measured characteristic is voltage.

25. The apparatus of claim 23 wherein the measured characteristic is resistance.

26. An apparatus for determining the physical orientation of a serial connector and selecting a serial communication interface comprising:

a connector for coupling the apparatus with another device;

one or more contacts for physically connecting lines between the apparatus and the other device;

detector circuitry for measuring an electrical characteristic of at least one of the one or more contacts;

switch circuitry operable to connect at least one of the one or more contacts to other circuitry in one or more configurations;

control circuitry operable to interface the detector circuitry with the switch circuitry, wherein the detector circuitry determines the physical orientation of the connector and selects a serial communication interface based on the measured characteristic and the control circuitry instructs the switch circuitry to configure itself accordingly; and a processor that is electrically coupled with the control circuitry, wherein the control circuitry instructs the processor to configure itself based on the determined physical orientation of the connector and the selected serial communication interface.

27. The apparatus of claim 26 wherein the measured characteristic is voltage.

28. The apparatus of claim 26 wherein the measured characteristic is resistance.

*29. An apparatus for determining the physical orientation of a connector comprising:*

*a first connector for coupling the apparatus with another device, the first connector including a plurality of contacts for physically connecting lines between the apparatus and the other device;*

*detector circuitry for monitoring a subset of at least one and fewer than all the plurality of contacts to determine*

*if the first connector is mated with a second connector in a first physical orientation or a second physical orientation;*

*switch circuitry operable to connect at least some of the plurality of contacts to other circuitry in the apparatus in a first configuration when the detector circuitry determines the first and second connectors are mated in the first physical orientation and in a second configuration when the detector circuitry determines the first and second connectors are mated in the second physical orientation;*

*control circuitry operable to interface the detector circuitry with the switch circuitry, wherein the control circuitry instructs the switch circuitry to configure itself according to the physical orientation determined by the detector circuitry; and*

*a processor that is electrically coupled with the control circuitry, wherein the control circuitry instructs the processor to configure itself based on the determined physical orientation of the connector.*

*30. The apparatus set forth in claim 29 wherein the switch circuitry is configured to, when connecting at least some of the plurality of contacts according to the first configuration, electrically connect a first data line within the first device to a first contact in the first connector and electrically connect a second data line within the first device to a second contact in the first connector, and when connecting at least some of the plurality of contacts according to the second configuration, electrically connect the first data line in the first device to the second contact in the first connector and electrically connect the second data line in the first device to the first contact in the first connector.*

*31. The apparatus set forth in claim 30 wherein the switch circuitry is further configured to electrically connect a third line within the first device to a third contact positioned between the first and second contacts in both the first and second configurations.*

*32. The apparatus set forth in claim 30 wherein the switch circuitry is further configured to set the first and second data lines within the first device to an open state prior to prior to electrically connecting the first and second data lines to either the first or second contacts according to either the first or second configurations.*

*33. The apparatus set forth in claim 30 wherein the detector circuit is configured to determine that the first connector is in the first orientation if the detected characteristic matches an expected characteristic.*

*34. The apparatus set forth in claim 29 wherein the switch circuitry is configured based on a selected communication interface in addition to the determined physical orientation.*

*35. An apparatus for determining the physical orientation of a connector comprising:*

*a first connector for coupling the apparatus with another device, the first connector including a plurality of contacts for physically connecting lines between the apparatus and the other device;*

*detector circuitry for monitoring a subset of at least one and fewer than all the plurality of contacts to determine if the first connector is mated with a second connector in a first physical orientation or a second physical orientation different from the first physical orientation;*

*switch circuitry operable to connect at least some of the plurality of contacts to other circuitry in the apparatus in a first configuration when the detector circuitry determines the first and second connectors are mated in the first physical orientation and in a second configuration when the detector circuitry determines the first and second connectors are mated in the second physical orientation; and*

*a processor that is electrically coupled with the switch circuitry and configured to operate the switch circuitry based on the determined physical orientation of the connector.*

*36. The apparatus set forth in claim 35 wherein the detector circuitry is configured to detect presence of a signal on monitored contacts, determine whether the detected signal matches an expected signal, and if the detected signal matches the expected signal, conclude that the second connector is in a first orientation with respect to the first connector.*

*37. The apparatus set forth in claim 35 wherein the plurality of contacts include a first data contact, a second data contact and a power contact.*

*38. The apparatus set forth in claim 37 wherein the switch circuitry is configured to, when connecting at least some of the plurality of contacts according to the first configuration, electrically connect a first data line within the first device to the first data contact in the first connector and electrically connect a second data line within the first device to the second data contact in the first connector, and when connecting at least some of the plurality of contacts according to the second configuration, electrically connect the first data line in the first device to the second data contact in the first connector and electrically connect the second data line in the first device to the first data contact in the first connector.*

*39. The apparatus set forth in claim 38 wherein the switch circuitry is further configured to electrically connect a third line within the first device to a third contact positioned between the first and second contacts in both the first and second configurations.*

*40. The apparatus set forth in claim 39 wherein the third contact is a third data contact.*

*41. The apparatus set forth in claim 38 wherein the switch circuitry is further configured to set the first and second data lines within the first device to an open state prior to electrically connecting the first and second data lines to either the first or second data contacts according to either the first or second configurations.*

*42. The apparatus set forth in claim 37 wherein the first and second data contacts are located at opposite positions.*

*43. The apparatus set forth in claim 37 wherein the first connector is a receptacle connector.*

*44. The apparatus set forth in claim 43 wherein the first connector includes a conductive shell coupled to ground.*

*45. The apparatus set forth in claim 35 wherein the subset of contacts monitored by the detector circuitry consists of two contacts.*

*46. The apparatus set forth in claim 35 wherein the processor is configured to operate the switch circuitry based on a selected communication interface in addition to the determined physical orientation.*

* * * * *

UNITED STATES PATENT AND TRADEMARK OFFICE

CERTIFICATE OF CORRECTION

PATENT NO. : RE45,050 E
APPLICATION NO. : 13/232989
DATED : July 29, 2014
INVENTOR(S) : Jeffrey J. Terlizzi, Stanley Rabu and Nicholas R. Kalayjian It is certified that error appears in the above-identified patent and that said Letters Patent is hereby corrected as shown below:

In the claims

Column 12, Line 41, Claim 7: please delete “where in” and insert --wherein--.

Signed and Sealed this
Seventh Day of October, 2014

Michelle K. Lee

Michelle K. Lee
*Deputy Director of the United States Patent and Trademark Office*